Feb. 12, 1935. W. P. EVANS ET AL 1,990,642
BRAKE LINING APPLICATOR
Filed May 11, 1934 2 Sheets-Sheet 2
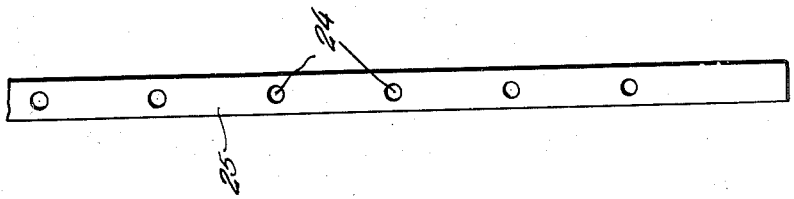
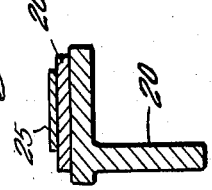
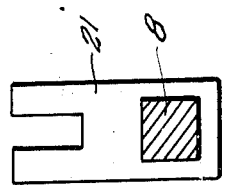
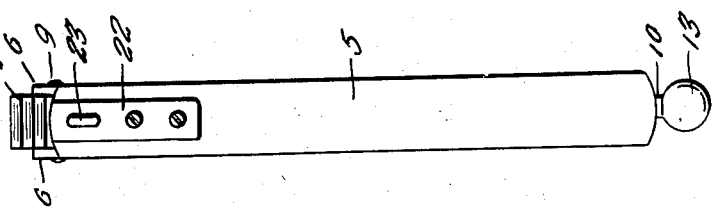
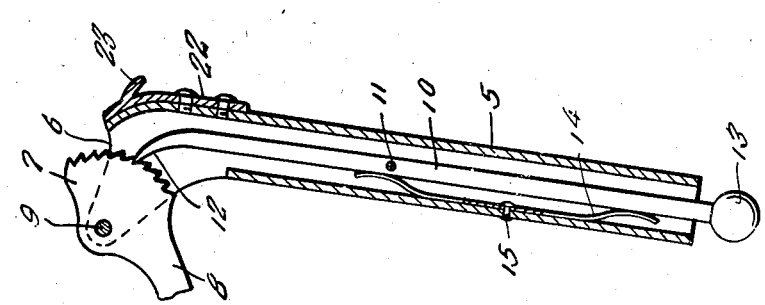
Inventors
W. P. Evans
J. H. Rawson
By Clarence A. O'Brien
Attorney Patented Feb. 12, 1935

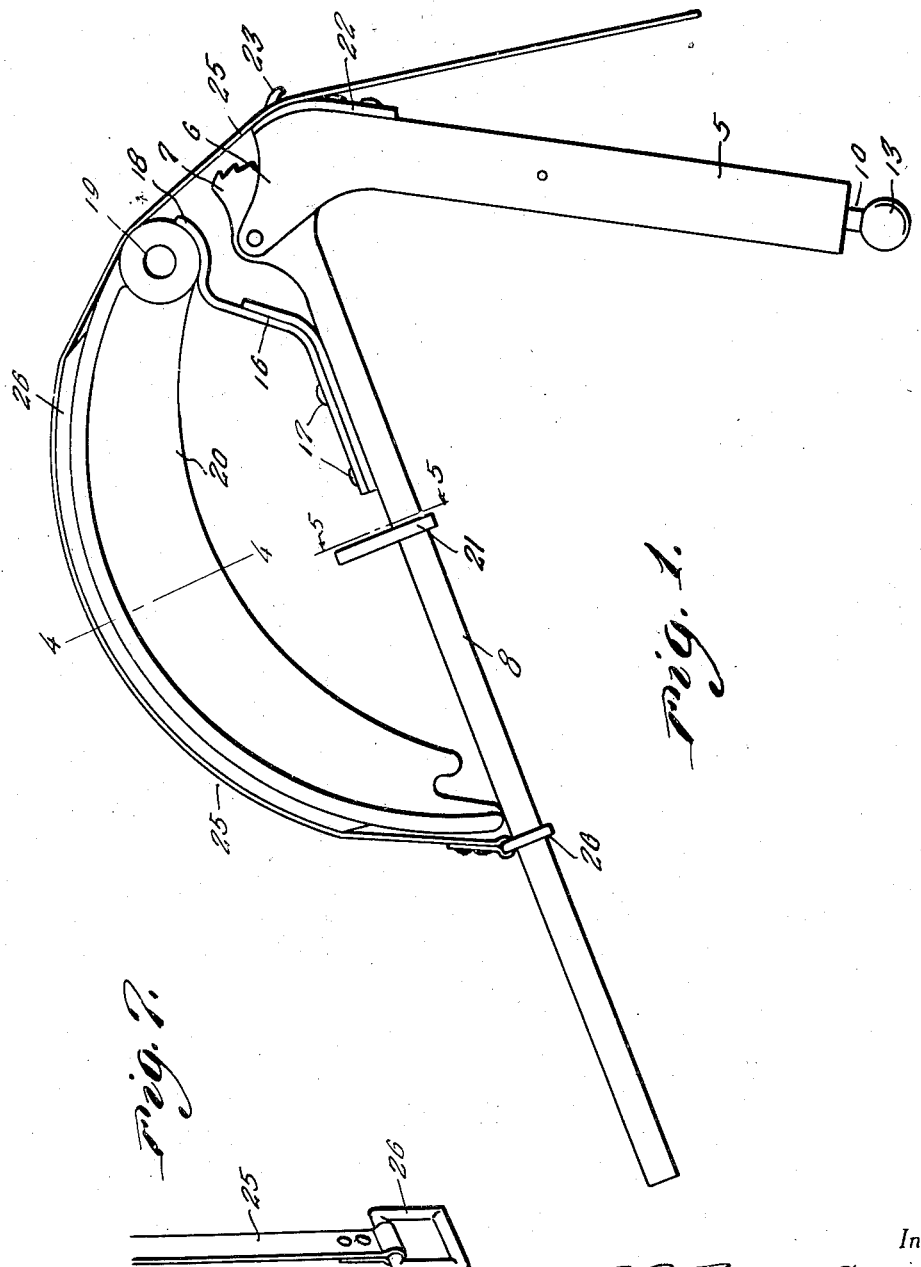

1,990,642

UNITED STATES PATENT OFFICE 1,990,642

BRAKE LINING APPLICATOR

Walter P. Evans and John H. Rawson,
Huntington Park, Calif.

Application May 11, 1934, Serial No. 725,208

4 Claims. (Cl. 29—84)

This invention appertains to new and useful improvements in means for installing brake linings on brake shoes.

The principal object of the present invention is to provide a brake lining applicator which will be easy to operate and greatly expedite the operation of placing brake linings.

Another important object of the present invention is to provide a brake lining applicator whereby the brake lining can be applied to a brake shoe and firmly retained in place while the same is being riveted in place on the shoe.

Other important objects and advantages of the invention will become apparent to the reader of the following specification.

In the drawings:

Figure 1 represents a side elevational view of the implement, with a shoe and lining carried thereby.

Figure 2 represents a vertical sectional view through the handle portion of the implement.

Figure 3 represents an end elevational view of the implement.

Figure 4 represents a sectional view taken substantially on line 4—4 of Figure 1.

Figure 5 represents a sectional view taken substantially on line 5—5 of Figure 1.

Figure 6 represents a fragmentary side elevational view of the perforated metallic strap.

Figure 7 represents a fragmentary perspective view of the loop end of the strap.

Referring to the drawings wherein like numerals designate like parts, it can be seen that numeral 5 represents an elongated tubular handle provided at one end with a pair of obliquely disposed extensions 6 between which a ratchet head 7 of an elongated guide bar 8 is pivotally mounted, as at 9.

Rockably supported in the handle 5 is a longitudinally extending rod 10 having its pivot, as at 11, the inner end of this rod 10 being provided with a pawl 12 engageable with the ratchet head 7, while its opposite end is provided with a hand knob 13. An elongated strip spring 14 is secured, as at 15, at its intermediate portion, to the handle 5, while its ends tensionally engage against the pivot point 11 and against a portion of the rod 10 adjacent the knob 13 so as to cause the pawl 12 to tensionally engage the ratchet head 7.

A leaf spring 16 is secured, as at 17, to the guide bar 8 adjacent its ratchet head 7, the same being formed at its free end to provide a saddle 18 for the eye end 19 of a brake shoe 20. Numeral 21 represents a bifurcated member slidably disposed on the guide bar 8, and this serves as a perch for the shoe under certain conditions.

At the inner end of the handle 5 a plate 22 is provided with a hook 23 which is engageable through any one of the number of openings 24 in the metallic ribbon or strap 25, which at one end is provided with the ring or loop 26 which can be slipped over the bar 8. Obviously, by placing the loop 26 in the position shown in Figure 1 and stretching the ribbon 25 over the lining 26 on the shoe 20 and engaging the hook 23 through one of the openings 24, the handle 5 and bar 8 can be moved toward each other to tighten the ribbon against the lining and securely retain the lining in place while the same is being riveted to the shoe.

The operation of the handle 5 causes the loop 26, carrying the metallic ribbon 25, and riding on the guide bar 8, to automatically adjust itself to the brake shoe 20.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A brake lining applicator comprising a handle, a guide bar pivotally connected at one end to one end of the handle, a ratchet on the pivotal end of the bar, a pawl for the ratchet, a hook on the handle, and a lining engaging strap provided with a loop at one end for self-adjusting disposition on the bar, said strap being provided with openings therein to receive the hook.

2. A brake lining applicator comprising a handle, a guide bar pivotally connected at one end to one end of the handle, a ratchet on the pivotal end of the bar, a pawl for the ratchet, a hook on the handle, a lining engaging strap provided with a loop at one end for self-adjusting disposition on the bar, said strap being provided with openings therein to receive the hook, and a leaf spring supported on the bar for a brake shoe.

3. A brake lining applicator comprising a handle, a guide bar pivotally connected at one end to one end of the handle, a ratchet on the pivotal end of the bar, a pawl for the ratchet, a hook on the handle, a lining engaging strap provided with a loop at one end for self-adjusting disposition on the bar, said strap being provided with openings therein to receive the hook, said handle being hollow, and a control rod extending through the handle for actuating the said pawl.

4. A brake lining applicator comprising a handle, a guide bar pivotally connected at one end to one end of the handle, a ratchet on the pivotal end of the bar, a pawl for the ratchet, a hook on the handle, a lining engaging strap provided with a loop at one end for self-adjusting disposition on the bar, said strap being provided with openings therein to receive the hook, and a slidable perch on the bar for engaging the brake shoe.

WALTER P. EVANS.
JOHN H. RAWSON.